United States Patent
Smulovics (10) Patent No.: US 12,536,004 B1
(45) Date of Patent: Jan. 27, 2026

(54) SYSTEM AND METHOD FOR ROUND-ROBINEDITING OF A GENERATED USER INTERFACE

(71) Applicant: Morgan Stanley Services Group Inc., New York, NY (US)

(72) Inventor: Peter Smulovics, Great Neck, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/206,558

(22) Filed: May 13, 2025

(51) Int. Cl.
  *G06F 8/38* (2018.01)
  *G06F 8/34* (2018.01)
  *G06Q 10/101* (2023.01)

(52) U.S. Cl.
  CPC ............ *G06F 8/38* (2013.01); *G06F 8/34* (2013.01); *G06Q 10/101* (2013.01)

(58) Field of Classification Search
  CPC ............ G06F 8/38; G06F 8/34; G06Q 10/101
  See application file for complete search history.

(56) References Cited

U.S. PATENT DOCUMENTS

| | | | |
|---|---|---|---|
| 2005/0183011 A1* | 8/2005 | Keohane | G06F 40/166 715/272 |
| 2006/0015816 A1 | 1/2006 | Kuehner et al. | |
| 2009/0024937 A1 | 1/2009 | Lauff et al. | |
| 2014/0026115 A1* | 1/2014 | Bank | G06F 8/38 717/113 |
| 2014/0047413 A1 | 2/2014 | Sheive et al. | |
| 2015/0242195 A1 | 8/2015 | Omura | |
| 2016/0170720 A1* | 6/2016 | Xue | G06F 8/34 717/113 |
| 2017/0177610 A1 | 6/2017 | Knotts et al. | |
| 2018/0143809 A1 | 5/2018 | Zang et al. | |
| 2019/0146898 A1* | 5/2019 | Silva | G06F 8/33 717/129 |
| 2019/0325012 A1* | 10/2019 | Delaney | G06Q 10/101 |
| 2020/0218514 A1 | 7/2020 | Wang | |
| 2020/0356365 A1* | 11/2020 | Pezaris | G06F 8/73 |
| 2021/0216705 A1* | 7/2021 | Handy Bosma | G06F 40/166 |
| 2021/0397776 A1 | 12/2021 | Abrahami et al. | |
| 2023/0401039 A1 | 12/2023 | Mathur et al. | |
| 2024/0143288 A1* | 5/2024 | Kalra | G06F 8/33 |
| 2024/0310978 A1 | 9/2024 | Frankel et al. | |

* cited by examiner

*Primary Examiner* — Rami R Okasha
(74) *Attorney, Agent, or Firm* — Leason Ellis LLP (57) ABSTRACT

A system and method allow user to perform round-robin editing of a user interface. The system receives initial user interface media corresponding to code for implementing a designer user interface, and receives user inputs from user in a round-robin manner. The IDE plugin module scans the code to detect at least two invisible patterns in the code, extracts a checksum from at least one of the at least two invisible patterns, and changes write access to portions of the code between the at least two invisible patterns. The import/export editing module determines the at least one user input does not change the scope of code, and generates and outputs edited UI media corresponding to an edited version of the initial user interface. The method implements the system.

20 Claims, 8 Drawing Sheets

SYSTEM AND METHOD FOR ROUND-ROBIN EDITING OF A GENERATED USER INTERFACE

FIELD OF THE DISCLOSURE

The present disclosure relates generally to user interface (UI) generators, and, more particularly, to a system and a method for round-robin editing of a generated user interface.

BACKGROUND OF THE DISCLOSURE

User interface (UI) generators allow a UI designer or a system architect to create UI media. The UI media specifies the elements, features, and components of a designer UI according to the inputs and selections of the UI designer to the UI generator. Once created, the UI media is used as code by a computing device to generate and output the designer UI at the computing device, allowing a user to interact with the computing device to provide the user with a what you see is what you get (WYSIWYG) experience. However, the designer UI created using known UI generators is fixed, in that a different UI designer cannot edit the original designer UI to permit the original designer UI to accept and implement such edits. Any changes in the UI media implemented by the different UI designer generates different code specifying an edited UI. Such different code cannot be loaded into or implemented by the original designer UI. Accordingly, known UI generators are one way, in that any edits to the original designer UI cannot be retained and used by the original designer UI.

The fixed nature of a designer UI presents a technical problem in that even the original UI designer is not able to back to the start of the UI designing process and back to the proverbial drawing board to make changes to the designer UI after a system using the designer UI is or has been developed or deployed. This technical problem is known as the "10,000:1 problem", in which changes later in the development process cause 10,000 times the effort to correct or change.

A round-robin activity refers to a group activity in which the members of the group take turns to perform an action. Utilization of a group of members provides a collaborative process allowing multiple participants an opportunity to contribute and to bring diverse perspectives to the creation or editing process. The content of the development process, such as software, is passed from one participant to the next, allowing for continuous refinement and improvement to ensure a high-quality final product.

In the context of editing software such as user interfaces, round-robin editing of user interfaces would provide the above-identified advantages in creating a high-quality user interface. However, since known UI generators are one-way, the development process of a user interface to include edits and refinements is hampered and experiences the 10,000:1 problem.

SUMMARY OF THE DISCLOSURE

According to an implementation consistent with the present disclosure, a system and a method allow a user interface designer or a system architect to perform round-robin editing of a generated user interface.

In an implementation, a computer-based system comprises a hardware-based processor, a memory, a communication interface, and a set of modules. The memory is configured to store instructions and configured to provide the instructions to the hardware-based processor. The communication interface is configured to receive initial user interface (UI) media corresponding to code for implementing a designer user interface on a computing device, and configured to receive at least one user input from at least one user in a round-robin manner. The set of modules is configured to implement the instructions provided to the hardware-based processor. The set of modules includes an integrated development environment (IDE) plugin module and an import/export editing module. The IDE plugin module is configured to scan the code to detect at least two invisible patterns in the code, to extract a checksum from at least one of the at least two the invisible patterns, and to enable or disable write access to portions of the code between the at least two invisible patterns. The import/export editing module is configured to determine whether the at least one user input changes a scope of the portions of the code, and responsive to the at least one user input not changing the scope, to perform write operations in the writable portions of the code to implement the at least one user input in the designer user interface, and to generate and output edited UI media corresponding to an edited version of the initial user interface.

The computer-based system can further comprise an input/output device including an editing interface, configured to display the code for implementing the designer user interface, and configured to receive the at least one user input from the at least one user. The editing interface can be responsive to the at least one user input to change the displayed code. The editing interface can include at least one tab, with each at least one tab displaying portions of the displayed code. The editing interface can be a graphical user interface (GUI) configured to visually interact with the at least one user to receive the at least one user input, respectively. The hardware-based processor can check for a plurality of user inputs from a plurality of users in a round-robin manner. The at least one of the at least two invisible patterns can include a moniker containing the checksum. The edited UI media can be selected from the group consisting of: edited visual UI media, edited audio UI media, edited UI parameters, and edited UI controls.

In another implementation, a computer-based method comprises receiving initial user interface (UI) media corresponding to a designer user interface; displaying code representing the initial UI media in an editing interface; receiving at least one user input representing a change at the editing to edit the designer user interface from at least one user in a round-robin manner; and scanning the code of the initial UI media for invisible patterns in the code. In the case that no invisible patterns are detected during scanning step, the method ends. In the case that invisible patterns are detected during the scanning step, the method changes write access to portions of code between the invisible patterns. In the case that invisible patterns are detected during the scanning step, the method examines proposed edits to writable sections of the code of the designer user interface. In the case that the proposed edits change the scope of a portion of the code, the method ends. In the case that the proposed edits do not change the scope of any portion of the code, the method implements the proposed edits to the designer user interface from the user to generate edited UI media. In the case that there are additional edits from another user, then the method loops back to the step of receiving at least one user input representing a change at the editing to edit the designer user interface from another user in a round-robin manner. In the case that there are no additional edits from all users, the method finalizes and outputs the edited UI media.

The method can further comprise providing an editing interface to the user; and displaying the code for implementing the designer user interface in the editing interface, wherein the receiving the at least one user input from the at least one user includes receiving the at least one user input through the editing interface. The editing interface can be responsive to the at least one user input to change the displayed code. The editing interface can include at least one tab, with each at least one tab displaying portions of the displayed code. The editing interface can be a graphical user interface (GUI) configured to visually interact with the at least one user to receive the at least one user input, respectively. The edited UI media can be selected from the group consisting of: edited visual UI media, edited audio UI media, edited UI parameters, and edited UI controls.

In a further implementation, a non-transitory computer-readable storage medium stores instructions executable by a processor to generate and output edited user interface (UI) media corresponding to an edited version of a designer user interface. The instructions comprise receiving initial user interface (UI) media corresponding to a designer user interface; displaying code representing the initial UI media in an editing interface; receiving at least one user input representing a change at the editing to edit the designer user interface from at least one user in a round-robin manner; scanning the code of the initial UI media for invisible patterns in the code; in the case that no invisible patterns are detected during scanning step, the method ends; in the case that invisible patterns are detected during the scanning step, writing access to portions of code between the invisible patterns is changed; in the case that invisible patterns are detected during the scanning step, examining proposed edits to writable sections of the code of the designer user interface; in the case that the proposed edits change the scope of a portion of the code, the method ends; in the case that the proposed edits do not change the scope of any portion of the code, implementing the proposed edits to the designer user interface from the user to generate edited UI media; in the case that there are additional edits from another user, then looping back to the step of receiving at least one user input representing a change at the editing to edit the designer user interface from another user in a round-robin manner; and in the case that there are no additional edits from all users, finalizing and outputting the edited UI media.

The non-transitory computer-readable storage medium can further comprise providing an editing interface to the user; and displaying the code for implementing the designer user interface in the editing interface, wherein the receiving the at least one user input from the at least one user includes receiving the at least one user input through the editing interface. The editing interface can be responsive to the at least one user input to change the displayed code. The editing interface can include at least one tab, with each at least one tab displaying portions of the displayed code. The editing interface can be a graphical user interface (GUI) configured to visually interact with the at least one user to receive the at least one user input, respectively. The edited UI media can be selected from the group consisting of: edited visual UI media, edited audio UI media, edited UI parameters, and edited UI controls.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

BRIEF DESCRIPTION OF THE DRAWINGS

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 100 and a method 700 which allow at least one user interface designer or at least one system architect to perform round-robin editing of a generated user interface.

Figure 1:
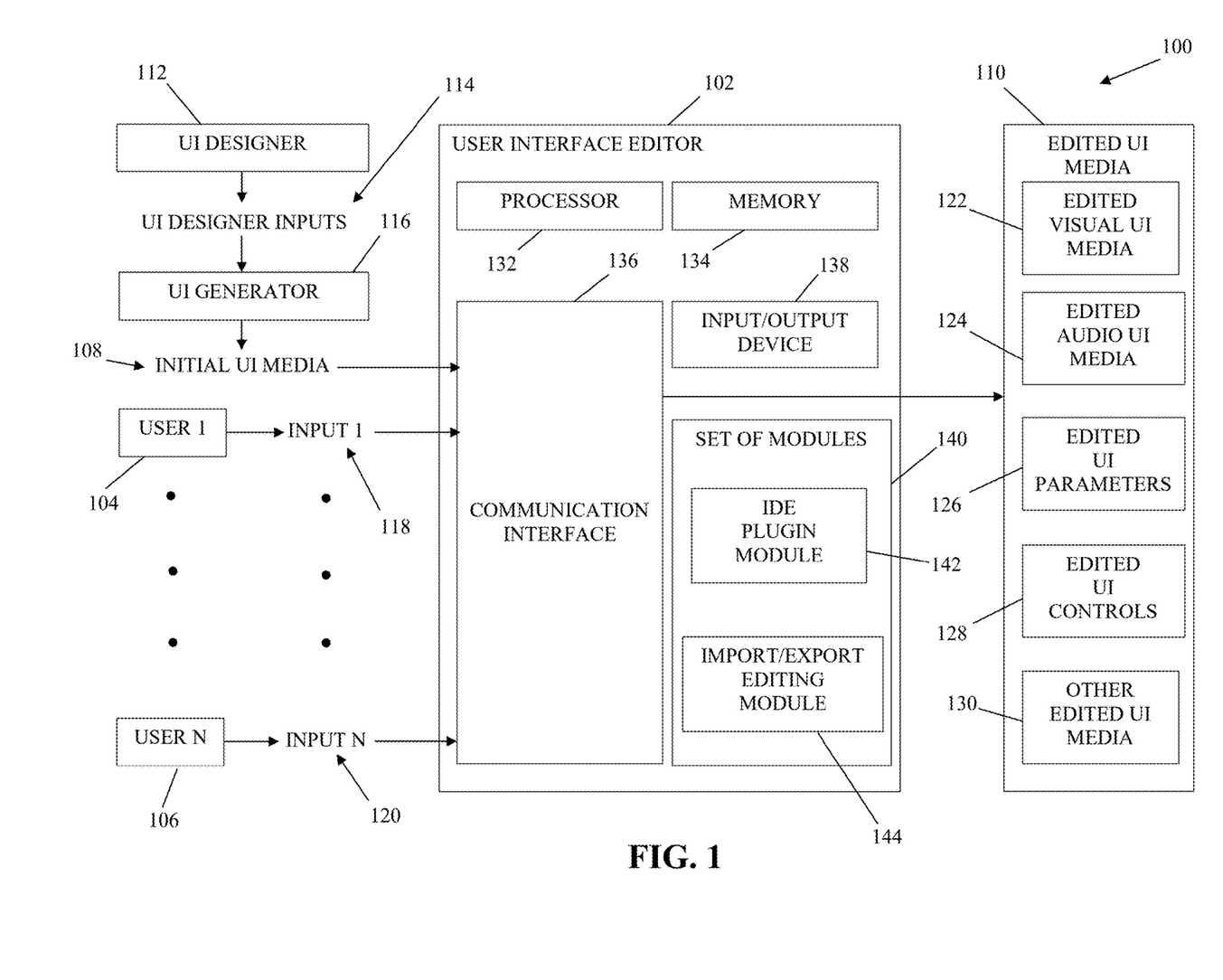
FIG. 1 is a schematic of a system for round-robin editing of a generated user interface, according to an implementation.

Referring to FIG. 1, in an implementation consistent with the invention, the system 100 includes a user interface editor 102 configured to allow at least one user 104, 106 to edit initial UI media 108 in a round-robin manner to generate edited UI media 110. The initial UI media 108 is created by a UI designer or a system architect 112 providing UI designer inputs 114 to a UI generator 116. The initial UI media 108 specifies a designed user interface, and is used by a computing device to generate and output the designed user interface at the computing device, allowing a user to interact with the computing device.

In an implementation consistent with the invention, the at least one user 104, 106 includes a first user 104, possibly a second user, and up to an Nth user 106 in which N is greater than or equal to 1. Each user 104, 106 generates a corresponding input 118, 120, respectively, using a corresponding input device. In response to receiving the initial UI media 108 and the at least one input 118, 120 through the communication interface 136, the user interface editor 102 generates the edited UI media 110 which includes at least one of edited visual UI media 122, edited audio UI media 124, edited UI parameters 126, edited UI controls 128, and other edit UI media 130.

Referring again to FIG. 1, in an implementation consistent with the invention, the system 100 includes a hardware-based processor 132, a memory 134 configured to store instructions and configured to provide the instructions to the hardware-based processor 132, a communication interface 136, an input/output device 138, and a set 140 of modules configured to implement the instructions provided to the hardware-based processor 132. The set 140 of modules includes an integrated development environment (IDE) plugin module 142 and an import/export editing module 144.

In one implementation, the system 100 is operatively connected to a data source through a network. In an implementation consistent with the invention, the user interface editor 102 of the system 100 receives the initial UI media 108 and the inputs 118, 120 through a network. For example, the network is the Internet. In another example, the network is an internal network or intranet of an organization. In a further example, the network is a heterogeneous or hybrid network including the Internet and the intranet.

Figure 2:
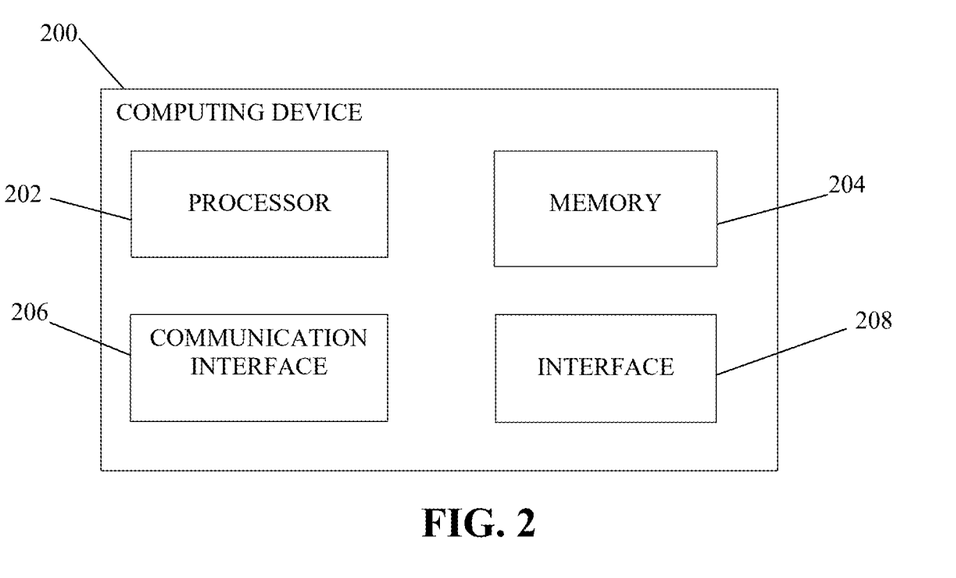
FIG. 2 is a schematic of a computing device used in the implementation of FIG. 1.

FIG. 2 illustrates a schematic of a computing device 200 including a processor 202 having code therein, a memory 204, and a communication interface 206. Optionally, the computing device 200 can include an interface 208, such as an input device, an output device, or an input/output device. The processor 202, the memory 204, the communication interface 206, and the interface 208 are operatively connected to each other via any known connections, such as a system bus, a network, etc. Any component, combination of components, and modules of the system 100 in FIG. 1 can be implemented by a respective computing device 200 and described below. In one implementation, a module includes software, such as an application, a procedure, a subroutine, a software-based object, or any known type of software. In another implementation, a module includes hardware, such as a hardware-based computing device, a hardware-based processor, a microprocessor, or any known type of hardware configured to perform functions. In a further implementation, a module includes both software and hardware.

For example, each of the user interface editor 102, the UI generator 116, an input device used by the UI designer 112 to generate the UI designer inputs, the input devices employed by the users 104, 106 to generate the inputs 118, 120, the processor 132, the memory 134, the communication interface 136, the input/output device 138, and the set 140 of modules including the IDE plugin module 142 and the import/export editing module 144 shown in FIG. 1 can be implemented by a respective computing device 200 shown in FIG. 2 and described below.

It is to be understood that the computing device 200 can include different components. Alternatively, the computing device 200 can include additional components. In another alternative implementation, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the interface 208. In another alternative implementation, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative implementation, the processor 202 can include a plurality of nodes or artificial neurons configured as an artificial neural network. The processor 202 can be configured to implement any known machine learning (ML) based devices, any known artificial intelligence (AI) based devices, and any known artificial neural networks, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative implementation, the instructions are executable by the processor 202 to cause the computing device 200 to execute an artificial neural network. The processor 202 can be implemented using hardware or software, such as the code. The processor 202 can implement a system, a sub-system, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The interface 208 can be any known device configured to perform user input and output functions. The interface 208 can be configured to receive an input from a user. Alternatively, the interface 208 can be configured to output information to the user. The interface 208 can be a computer monitor, a television, a loudspeaker, a computer speaker, or any other known device operatively connected to the computing device 200 and configured to output information to the user. A user input can be received through the interface 208 implementing a keyboard, a mouse, or any other known device operatively connected to the computing device 200 to input information from the user. Alternatively, the interface 208 can be implemented by any known touchscreen. The computing device 200 can include a server, a personal computer, a laptop, a smartphone, or a tablet.

Figure 3:
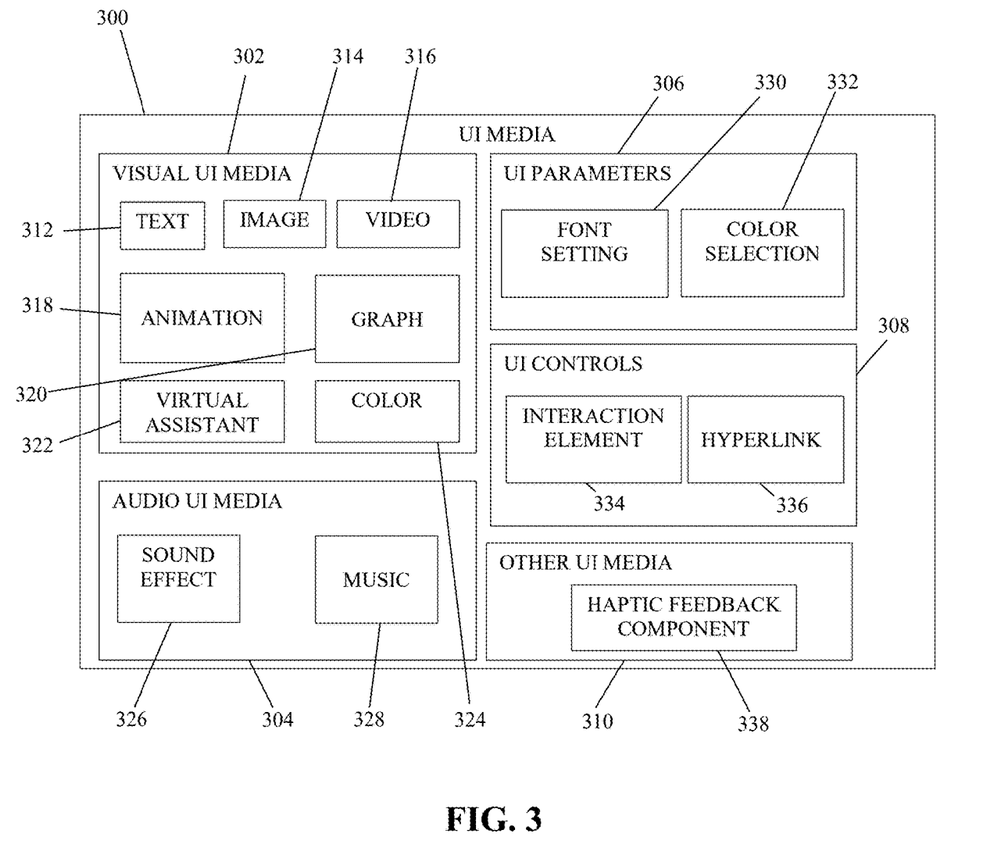
FIG. 3 is a schematic of user interface media and example components.

Referring to FIGS. 1 and 3, the initial UI media 108 and the edited UI media 110 include UI media 300, as shown in FIG. 3. The UI media 300 are used by a processor, a memory, and an input/output device to generate a user interface for at least one user to interact with a computing device. For example, a user interface (UI) includes input components, navigational components, information components, display aspects, audio aspects, and feedback mechanisms. An input component is used to initiate an interaction between the user and the computing device, including menu buttons, checkboxes, dropdown lists, free text fields, radio buttons, and anything which can be tapped or swiped on a display screen. Navigational components include elements used to move around an environment. Information components provide information to the user, such as a progress bar, breadcrumbs, search boxes. Display aspects include graphics, windows, transitions, menus, icons, text, fonts, images, color palettes, layout, text boxes, messages, color changes, virtual assistants, and any other signposting. Audio aspects include sound prompts. Feedback mechanisms allow the user interface to communicate back to the user, such as displays, audio speakers, and haptic feedback devices.

As shown in FIG. 3, the UI media 300 includes visual UI media 302, audio UI media 304, UI parameters 306, UI controls 308, and other UI media 310. In one implementation, the visual UI media 302 includes at least one of text 312 such as alphanumeric data and information, an image 314 such as a single still image, a video 316, an animation 318, a graph 320 representing numerical data, a visual-based virtual assistant 322, a color 324, and any other known visual media used in a user interface. The audio UI media 304 includes at least one of a sound effect 326, music 328, and any other known audio media used in a user interface. The UI parameters 306 include a font setting 330, a color selection 332, and any other known UI parameters used in a user interface. The UI controls 308 includes at least one of an interaction element 334, a hyperlink 336, and any other known control used in a user interface. For example, the interaction element 334 includes a graphical widget, a button, an actuatable icon, or a scroll bar. The other UI media 338 includes at least one of a haptic feedback component or any other known UI media used in a user interface.

Figure 4:
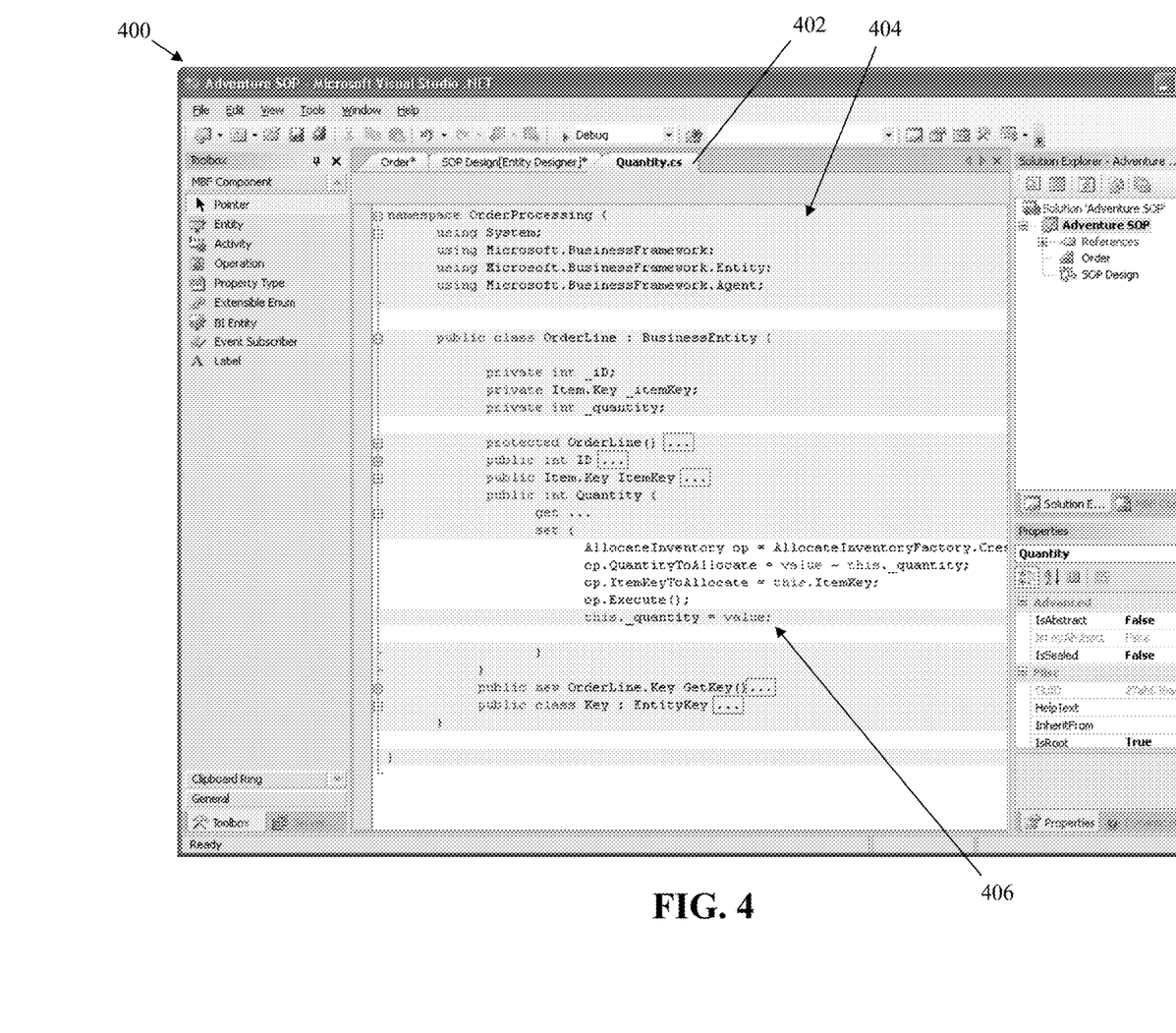
FIG. 4 is a screenshot of an editing interface of a user interface editor according to the implementation of FIG. 1.

Referring to the screenshot in FIG. 4, an editing interface 400 of the user interface editor 102 includes at least one tab 402 providing at least one editing workspace 404 in which the users 104, 106 input and edit code 406 to create edited code corresponding to a revised or customized user interface. In an implementation consistent with the invention, the tab 402 displays Quantity.cs code 406 corresponding to the initial UI media 108 of FIG. 1 created by a UI designer or a system architect 112. Using the editing interface 400, the users 104, 106 edit the code 406 in a round-robin editing manner by entering the inputs 118, 120, respectively, in the editing workspace 404. In one implementation, the editing interface 400 is a graphical user interface (GUI) configured to perform GUI-based input and output operations. In another implementation, the editing interface 400 is a command-line interface (CLI) configured to perform CLI-based input and output operations. In a further implementation, the editing interface 400 is any known type of user interface configured to edit code from user inputs and for displaying the initial code and the edited code.

Figure 5:
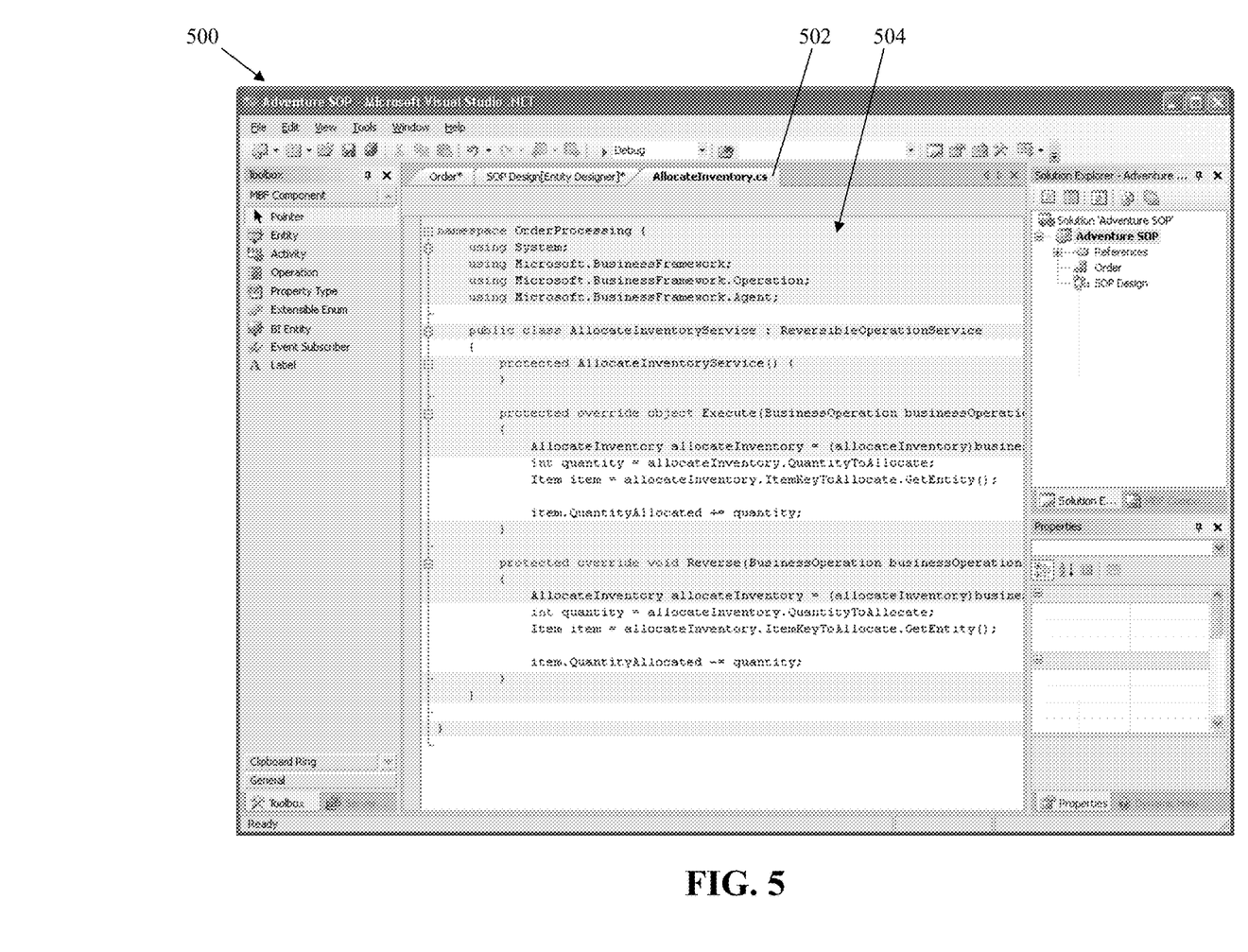
FIG. 5 is a screenshot of a tab of the editing interface of FIG. 4.

Referring to the screenshot in FIG. 5, the editing interface 500 of the user interface editor 102 includes a selected tab 502 displaying an editing workspace 504 to allow the users 104, 106 to edit the displayed AllocateInventory.cs code in the tab 502 in a round-robin editing manner by entering the inputs 118, 120, respectively, in the editing workspace 504. In one implementation, the editing interface 500 is a graphical user interface (GUI) configured to perform GUI-based input and output operations. In another implementation, the editing interface 500 is a command-line interface (CLI) configured to perform CLI-based input and output operations. In a further implementation, the editing interface 500 is any known type of user interface configured to edit code from user input and for displaying the initial code and the edited code.

Figure 6:
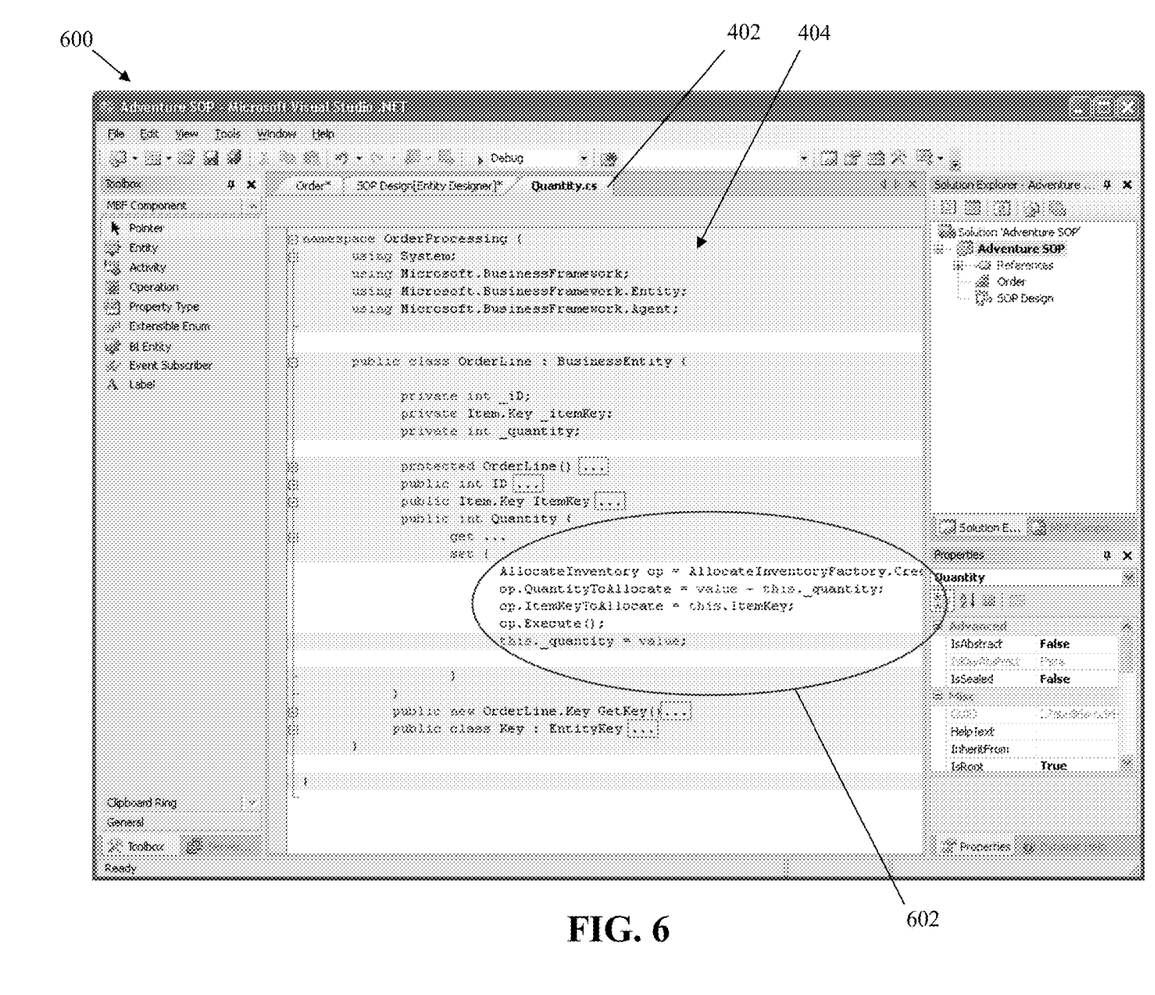
FIG. 6 is a screenshot of the editing interface of FIG. 4 with a highlighted section of code.

Referring to the screenshot in FIG. 6, the editing interface 600 of the user interface editor 102 corresponds to the editing interface 400 of FIG. 4, with the tab 402 displaying the Quantity.cs code with a highlighted section 602 of code. In one implementation, the highlighted section 602 provides a visual showing that a line of code has been edited, removed, or added which should not have modified, such as by a user or by an automated editor application. For example, as shown in FIG. 6, the visual showing is a circle or oval surrounding the affected lines of code. In another example, the visual showing is a rectangle or other closed curve extending around the affected lines of code. In a further example, the visual showing includes squiggly lines surrounding the affected lines of code. In still another example, the visual showing includes changing the color of the text of the affected code, such as red text for the altered code while unaltered code is colored black. In another example, the visual showing includes changing the background color of the text of the affected code, such as yellow background for black text, while the unaffected code has black text on white or gray backgrounds.

Referring to FIG. 1 and FIGS. 4-6, the IDE plugin module 142 scans the code of the initial UI media 108 displayed in the tabs 402, 502 to detect invisible patterns or hidden text in the code. The invisible patterns or hidden text are indicated by a predetermined delimiter or matching delimiters. In one implementation, such invisible patterns are specified by the #region delimiter for code in the Python and C# programming languages. In another implementation, the invisible patterns are specified by //region or //<editor-fold> delimiters in the Java programming language. In a further implementation, the invisible patterns are specified by //#region delimiter in the JavaScript programming language. In still another implementation, the invisible patterns are specified by //#region delimiter in the TypeScript programming language, with no space between "//" and "#".

If no invisible patterns are present in the code, the editing of the code ends. Otherwise, once such invisible patterns are detected in the lines or portions of the code, the IDE plugin module 142 enables or disables write access to the lines of code between the invisible patterns. In one implementation, if the IDE plugin module 142 is not enabled, the IDE plugin module 142 is not active to produce any status message indicating that write access is not enabled. Once the IDE plugin module 142 is re-enabled, or if a complier is run outside of an enabled IDE plugin module 142, the IDE plugin module 142 detects errors or other circumstances in which a line of code has been edited, removed, or added which should not have modified, and so allowing the editing interface 600 to show the affected code by the highlighting section 602 in FIG. 6.

In an implementation consistent with the invention, the invisible patterns contain a moniker. The moniker is either printable or unprintable. The moniker includes a checksum value of the code or information outside of the detected invisible patterns. The IDE plugin module 142 extracts the checksum from the moniker. By using the checksum, the designer user interface detects whether or not an IDE attempting to edit the designer user interface has the IDE plugin module 142 enabled. If the IDE plugin module 142 is not enabled, the designer user interface is protected from being edited.

However, if the IDE plugin module 142 is enabled, the designer user interface is editable. In an alternative implementation, the moniker includes a hash number or hash code to perform tamper detection of an edited UI. For example, the hash code includes a non-printable character such as an ASCII control character.

In one implementation, the import/export editing module 144 modifies an import/export portion of the code of a user interface being edited. The import/export editing module 144 checks the checksum of the code or information outside of the invisible patterns detected by the IDE plugin module 142. By checking the checksum, the import/export editing module 144 confirms that the checksums are kept intact as the code is edited. In addition, the import/export editing module 144 also visually displays errors in the editing process, with the visual display of errors output through the input/output device 138, depending on configuration settings of the input/output editing module 144.

The import/export editing module 144 examines proposed edits to a user interface which potentially change the scope of portions of the code of the user interface. For writable sections of the code of an interface, there should not be any scope change. For example, changes in the code affecting a right brace "}" in C#, Java, or C++ code of a user interface, or changes in indentation of Python code for a user interface to be a smaller indentation. Accordingly, potential edits to the code of a user interface which affect the scope are prevented from being implemented, which protects the user interface being edited as real round robin editing of a user interface such as a designer UI is being performed. Otherwise, if such potential changes do not affect the scope, then the proposed changes to the designer user interface are implemented by the user interface editor 102. The user interface editor 102 continues to receive and process inputs 118, 120 from the users 104, 106, respectively, in a round-robin manner until all edits from all of the users 104, 106 are received and processes. The user interface editor 102 then finalizes and outputs the edited UI media 110 representing an edited version of the designer user interface.

Figure 7A:
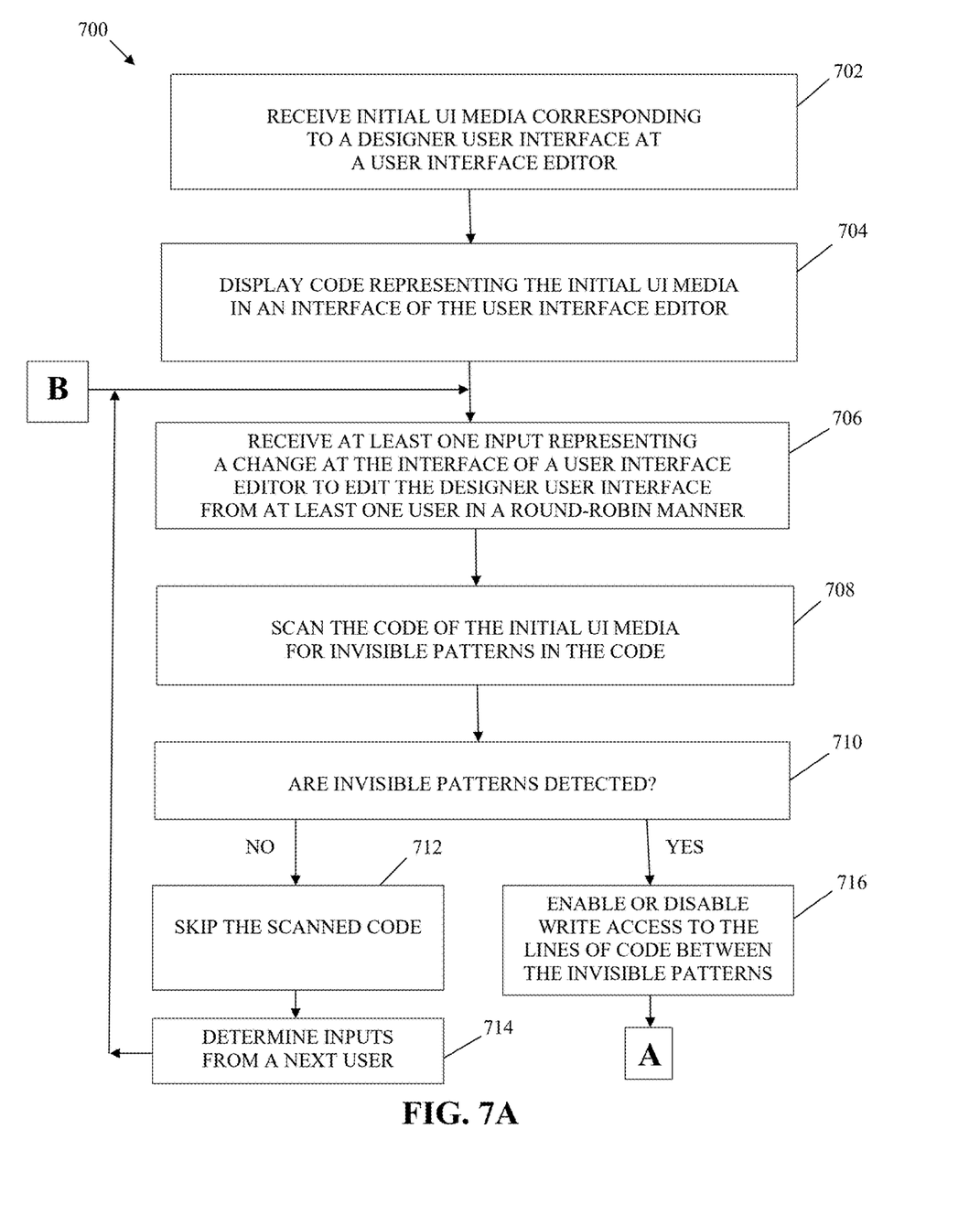
FIGS. 7A-7B are a flowchart of operation of a method implementing the system of FIG. 1.
Figure 7B:
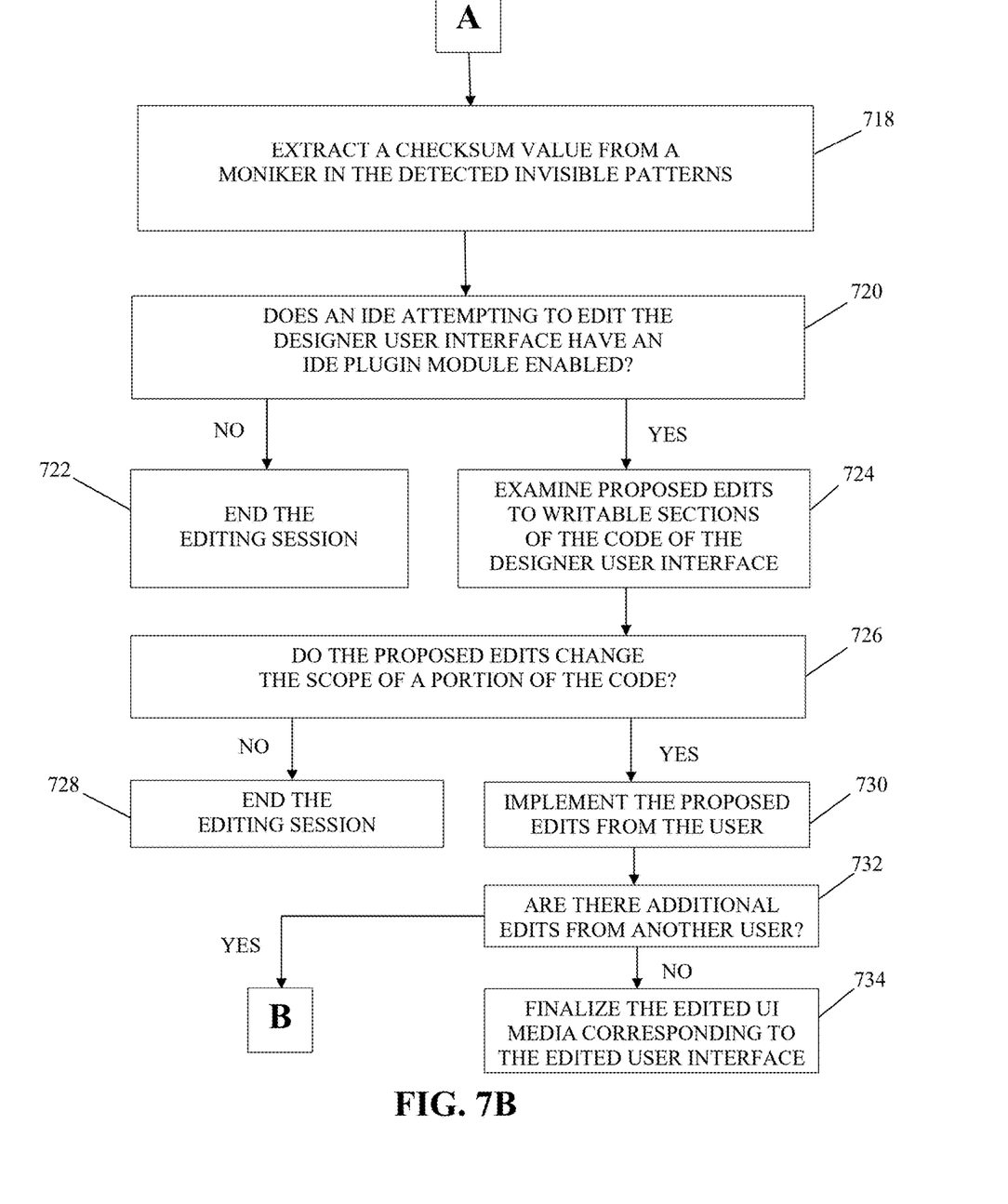

Referring to FIGS. 7A-7B, the computer-based method 700 includes receiving initial UI media 108 corresponding to a designer user interface at the user interface editor 102 in step 702, displaying code representing the initial UI media in an editing interface 400, 500 of the user interface editor 102 as shown in FIGS. 4-6 in step 704, receiving at least one input from a user representing a change at the editing interface 400, 500 of the user interface editor 102 by the user to edit the designer user interface from the user in a round-robin manner in step 706, and scanning the code of the initial UI media 108 for invisible patterns in the code in step 708. If no invisible patterns are detected in the code in step 710, the user interface editor 102 deems that the scanned code is not involved in the round-robin examination and editing by the user, and so the user interface editor 102 skips the scanned code in step 712. The method 700 then determines inputs from a next user in the round-robin editing in step 714, and loops back to perform steps 706-710 for the next user.

However, if invisible patterns are detected in step 710, the IDE plugin module 142 enables or disables write access to the lines of code between the invisible patterns in step 716. By default, if no delimiters of invisible patterns or hidden text are found in the code or portions of the code, such as #region for code in the Python and C# programming languages, such code or portions of the code are editable. When any delimiters are found in the code, the delimited portions of the code that would be visually distinguished in the editing workspace 404 with a gray background shown in FIGS. 4 and 6 become non-editable.

The method 700 then extracts a checksum value from a moniker in the detected invisible patterns 718, and then the method determines if an IDE attempting to edit the designer user interface has an IDE plugin module 142 enabled in step 720. If the IDE does not include an IDE plugin module 142, the editing session ends in step 722. However, if the IDE does include an IDE plugin module 142, the method 700 proceeds to examine proposed edits to writable sections of the code of the designer user interface in step 724. If the proposed edits change the scope of a portion of the code as detected in step 726, the method 700 ends the editing section in step 728. Otherwise, if the proposed edits do not change the scope of any portion of the code as detected in step 726, the user interface editor 102 implements the proposed edits from the user in step 730. The method 700 then determines if there are additional edits from another user in step 732. If there are additional edits from another user, then the method 700 loops back to perform steps 706-732, until all additional edits from other users are received and processed by the user interface editor 702. Otherwise, if the method 700 determines if there are no additional edits from another user in step 732, the user interface module 102 finalizes and outputs the edited UI media 100 corresponding to the edited user interface in step 734.

In an implementation consistent with the invention, a non-transitory computer-readable storage medium stores instructions executable by a processor to generate and output edited user interface (UI) media corresponding to an edited version of a designer user interface. The instructions include receiving initial UI media corresponding to the designer user interface; receiving initial user interface (UI) media corresponding to a designer user interface; displaying code representing the initial UI media in an editing interface; receiving at least one user input representing a change at the editing to edit the designer user interface from at least one user in a round-robin manner; scanning the code of the initial UI media for invisible patterns in the code; in the case that no invisible patterns are detected during scanning step, the method ends; in the case that invisible patterns are detected during the scanning step, writing access to portions of code between the invisible patterns is changed; in the case that invisible patterns are detected during the scanning step, examining proposed edits to writable sections of the code of the designer user interface; in the case that the proposed edits change the scope of a portion of the code, the method ends; in the case that the proposed edits do not change the scope of any portion of the code, implementing the proposed edits to the designer user interface from the user to generate edited UI media; in the case that there are additional edits from another user, then looping back to the step of receiving at least one user input representing a change at the editing to edit the designer user interface from another user in a round-robin manner; and in the case that there are no additional edits from all users, finalizing and outputting the edited UI media.

By providing the system 100 and the method 700 with a user interface editor 102 allowing round-robin editing of a designer UI, specified by the initial UI media 108, UI developers avoid costly parsing of code changes as well as having more freedom to apply changes in code and the initial UI media 108 to edit the designer UI created by another UI designer. In addition, the system 100 and the method 700 enables high fidelity visual editing of user interfaces, system structures, and other software in connection with user interfaces with real round-robin editing.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based system, comprising:
   a hardware-based processor;
   a memory configured to store instructions and configured to provide the instructions to the hardware-based processor;
   a communication interface configured to receive initial user interface (UI) media corresponding to code for implementing a designer user interface on a computing device, and configured to receive at least one user input from at least one user in a round-robin manner; and
   a set of modules configured to implement the instructions provided to the hardware-based processor, the set of modules including:
      an integrated development environment (IDE) plugin module configured to scan the code to detect at least two invisible patterns in the code, to extract a checksum from at least one of the at least two invisible patterns, and to enable or disable write access to portions of the code between the at least two invisible patterns based on the checksum indicating that the IDE plugin module is enabled to make edits to the designer user interface; and
      an import/export editing module configured to determine whether the at least one user input changes a scope of the portions of the code, and responsive to the at least one user input not changing the scope, to perform write operations in the writable portions of the code to implement the at least one user input in the designer user interface, and to generate and output edited UI media corresponding to an edited version of the initial user interface.

2. The computer-based system of claim 1, further comprising:
   an input/output device including an editing interface, configured to display the code for implementing the designer user interface, and configured to receive the at least one user input from the at least one user.

3. The computer-based system of claim 2, wherein the editing interface, responsive to the at least one user input, changes the displayed code.

4. The computer-based system of claim 2, wherein the editing interface includes at least one tab, with each at least one tab displaying portions of the displayed code.

5. The computer-based system of claim 2, wherein the editing interface is a graphical user interface (GUI) configured to visually interact with the at least one user to receive the at least one user input, respectively.

6. The computer-based system of claim 1, wherein the hardware-based processor checks for a plurality of user inputs from a plurality of users in a round-robin manner.

7. The computer-based system of claim 1, wherein the at least one of the at least two invisible patterns includes a moniker containing the checksum.

8. The computer-based system of claim 1, wherein the edited UI media is selected from the group consisting of:

edited visual UI media, edited audio UI media, edited UI parameters, and edited UI controls.

9. A computer-based method, comprising:
  receiving initial user interface (UI) media corresponding to a designer user interface;
  displaying code representing the initial UI media in an editing interface;
  receiving at least one user input representing a change at the editing interface to edit the designer user interface from at least one user in a round-robin manner;
  scanning the code of the initial UI media to detect for at least two invisible patterns in the code;
  in the case that no invisible patterns are detected during scanning step, ending the method;
  in the case that at least two invisible patterns are detected during the scanning step, extracting a checksum from at least one of the detected at least two invisible patterns;
  in the case that at least two invisible patterns are detected during the scanning step, enabling or disabling write access to portions of the code between the detected at least two invisible patterns based on the checksum indicating that an integrated development environment (IDE) plugin module is enabled to make edits to the designer user interface;
  in the case that at least two invisible patterns are detected during the scanning step, changing write access to portions of code between the detected at least two invisible patterns;
  in the case that at least two invisible patterns are detected during the scanning step, examining proposed edits to writable sections of the code of the designer user interface;
  in the case that the proposed edits change the scope of a portion of the code, ending the method;
  in the case that the proposed edits do not change the scope of any portion of the code, implementing the proposed edits to the designer user interface from the user to generate edited UI media;
  in the case that there are additional edits from another user, then looping back to the step of receiving at least one user input representing a change at the editing interface to edit the designer user interface from another user in a round-robin manner; and
  in the case that there are no additional edits from all users, finalizing and outputting the edited UI media.

10. The computer-based method of claim 9, further comprising:
  providing an editing interface to the user; and
  displaying the code for implementing the designer user interface in the editing interface,
  wherein the receiving the at least one user input from the at least one user includes receiving the at least one user input through the editing interface.

11. The computer-based method of claim 10, wherein the editing interface, responsive to the at least one user input, changes the displayed code.

12. The computer-based method of claim 10, wherein the editing interface includes at least one tab, with each at least one tab displaying portions of the displayed code.

13. The computer-based method of claim 10, wherein the editing interface is a graphical user interface (GUI) configured to visually interact with the at least one user to receive the at least one user input, respectively.

14. The computer-based method of claim 9, wherein the edited UI media is selected from the group consisting of: edited visual UI media, edited audio UI media, edited UI parameters, and edited UI controls.

15. A non-transitory computer-readable storage medium storing instructions executable by a processor to generate and output edited user interface (UI) media corresponding to an edited version of a designer user interface, the instructions comprising:
  receiving initial UI media corresponding to the designer user interface;
  displaying code representing the initial UI media in an editing interface;
  receiving at least one user input representing a change at the editing interface to edit the designer user interface from at least one user in a round-robin manner;
  scanning the code of the initial UI media to detect for at least two invisible patterns in the code;
  in the case that no invisible patterns are detected during scanning step, ending the method;
  in the case that at least two invisible patterns are detected during the scanning step, extracting a checksum from at least one of the detected at least two invisible patterns;
  in the case that at least two invisible patterns are detected during the scanning step, enabling or disabling write access to portions of the code between the detected at least two invisible patterns based on the checksum indicating that an integrated development environment (IDE) plugin module is enabled to make edits to the designer user interface;
  in the case that invisible patterns are detected during the scanning step, changing write access to portions of code between the detected at least two invisible patterns;
  in the case that invisible patterns are detected during the scanning step, examining proposed edits to writable sections of the code of the designer user interface;
  in the case that the proposed edits change the scope of a portion of the code, ending the method;
  in the case that the proposed edits do not change the scope of any portion of the code, implementing the proposed edits to the designer user interface from the user to generate edited UI media;
  in the case that there are additional edits from another user, then looping back to the step of receiving at least one user input representing a change at the editing interface to edit the designer user interface from another user in a round-robin manner; and
  in the case that there are no additional edits from all users, finalizing and outputting the edited UI media.

16. The non-transitory computer-readable storage medium of claim 15, further comprising:
  providing an editing interface to the user; and
  displaying the code for implementing the designer user interface in the editing interface,
  wherein the receiving the at least one user input from the at least one user includes receiving the at least one user input through the editing interface.

17. The non-transitory computer-readable storage medium of claim 16, wherein the editing interface, responsive to the at least one user input, changes the displayed code.

18. The non-transitory computer-readable storage medium of claim 16, wherein the editing interface includes at least one tab, with each at least one tab displaying portions of the displayed code.

19. The non-transitory computer-readable storage medium of claim 16, wherein the editing interface is a graphical user interface (GUI) configured to visually interact with the at least one user to receive the at least one user input, respectively.

20. The non-transitory computer-readable storage medium of claim 15, wherein the edited UI media is selected from the group consisting of: edited visual UI media, edited audio UI media, edited UI parameters, and edited UI controls.

\* \* \* \* \*